United States Patent [19]

Levrai

[11] Patent Number: 5,046,314
[45] Date of Patent: Sep. 10, 1991

[54] CONTROL DEVICE OF A BRAKE BOOSTER, APPLYING ADDITIONAL FORCE WHEN A PRESSURE DIFFERENCE BETWEEN A FRONT AND REAR BOOSTER CHAMBER EXCEEDS A PRE-DETERMINED THRESHOLD

[75] Inventor: Roland Levrai, Stains, France

[73] Assignee: Bendix France, Drancy, France

[21] Appl. No.: 430,741

[22] Filed: Oct. 31, 1989

[30] Foreign Application Priority Data

Nov. 10, 1988 [FR] France ............... 8814729
May 31, 1989 [FR] France ............... 8907146

[51] Int. Cl.⁵ .......................... B60T 13/20
[52] U.S. Cl. ................... 60/555; 137/627.5; 137/907
[58] Field of Search ........ 60/555, 546; 91/28, 91/29, 32, 33, 517, 518; 137/627.5, 907

[56] References Cited

U.S. PATENT DOCUMENTS

| | | | |
|---|---|---|---|
| 3,107,693 | 10/1963 | Puster et al. | 137/627.5 |
| 3,580,646 | 5/1971 | Ternent | 137/627.5 |
| 4,117,769 | 10/1978 | Carré et al. | 91/170 R |
| 4,117,865 | 10/1978 | Beck | 137/627.5 |
| 4,208,872 | 6/1980 | Shimizu et al. | 60/547.1 |
| 4,337,798 | 7/1982 | Zettergren | 137/627.5 |
| 4,610,483 | 9/1986 | Matsumoto et al. | 303/97 |
| 4,638,837 | 1/1987 | Buike et al. | 137/627.5 |
| 4,691,968 | 9/1987 | Pugh et al. | 137/627.5 |

FOREIGN PATENT DOCUMENTS 0260046 3/1988 European Pat. Off. .
3517850 5/1984 Fed. Rep. of Germany .
2334862 7/1977 France .

Primary Examiner—Edward K. Look
Assistant Examiner—F. Daniel Lopez
Attorney, Agent, or Firm—Larry J. Palguta; Ken C. Decker

[57] ABSTRACT

In order to increase the efficiency of a booster (10), the rear chamber (18) of which contains an auxiliary drive member (28) having a pressure chamber (30) connected to a pressure source (34) via a control device (36), the latter comprises a normally closed valve (38), via which the source (34) can communicate with the pressure chamber (30), and a mechanism (40) actuating this valve, which controls the opening of the latter automatically when the pressure in the rear chamber (18) exceeds the pressure in the front chamber (16) of the booster by a given value. Such an assembly can be used particularly on a braking system of a motor vehicle.

15 Claims, 2 Drawing Sheets 5,046,314

CONTROL DEVICE OF A BRAKE BOOSTER, APPLYING ADDITIONAL FORCE WHEN A PRESSURE DIFFERENCE BETWEEN A FRONT AND REAR BOOSTER CHAMBER EXCEEDS A PRE-DETERMINED THRESHOLD

BACKGROUND OF THE INVENTION

The invention relates to a control device intended to be associated with a booster, especially with a booster equipping the braking system of a motor vehicle.

More specifically, the invention relates to a control device intended to be used on a booster, such as that described in U.S. Pat. No. 4,117,769. This patent describes a booster comprising, in the usual way, a housing in which is seated a drive piston forming inside the housing a front chamber and a rear chamber. The actuation of the brake pedal moves an input control member of the booster which acts on a control valve, the effect of which is to generate a pressure difference between the rear chamber and the front chamber. This pressure difference results in the application of a boosting force which is added to the mechanical force exerted on the control member.

In this document, the booster also possesses, inside the rear chamber, an auxiliary drive member having a pressure chamber capable of being connected to an external pressure source by means of a control device. When the control device is actuated, the auxiliary drive member thus exerts on the drive piston of the booster an auxiliary boosting force completely independent of the boosting force caused by the actuation of the brake pedal. In U.S. Pat. No. 4,117,769, this auxiliary boosting force is used completely independently of the normal braking system of the vehicle, in order to make it possible to add an assisted automatic braking system to the latter, without the need to resort to an additional booster.

SUMMARY OF THE INVENTION

The subject of the present invention is an entirely different use of the booster equipped with an auxiliary drive member, such as that described in U.S. Pat. No. 4,117,769, the auxiliary drive member no longer being used to make it possible to actuate the brakes of the vehicle by means of an automatic system independent of the braking system of the vehicle, but on the contrary to improve the efficiency of the latter system under certain braking conditions.

More specifically, the subject of the invention is a control device of a booster of the above-mentioned type, designed to exert an additional boosting force automatically on the drive piston of the booster in the event of a vigorous and prolonged actuation of the brake pedal, thus making it possible to reduce the overall diametrical dimension of the booster for a given boosting force, or, on the contrary, increase the boosting force for an unchanged overall dimension.

According to the invention, this result is obtained by means of a control device of a booster comprising a housing, in which a drive piston separating a front chamber from a rear chamber can move in the event of an actuation of an input control member generating a pressure difference between the rear chamber and the front chamber, an auxiliary drive member having a pressure chamber being placed in the rear chamber of the booster the control device being placed between the pressure chamber of the booster and a pressure source and further comprising a normally closed valve, via which the pressure chamber communicates with the pressure source, and means for actuating said valve which are sensitive to the pressure difference between the rear chamber and the front chamber, in order to open the valve automatically when this difference exceeds a predetermined threshold.

Advantageously, the control device according to the invention comprises a hollow body, in which are formed a pressurized-fluid inlet chamber communicating with the pressure source, a pressurized-fluid outlet chamber communicating with the pressure chamber, a first control chamber communicating with the front chamber and a second control chamber communicating with the rear chamber, said inlet and outlet chambers forming between them a first valve seat, against which a shutter is normally kept bearing sealingly by a first elastic means, the first and second control chambers being separated sealingly by a means forming a piston which is axially aligned with the valve seat and an extension of which carries a second valve seat capable of coming to bear sealingly on the shutter and of moving the latter away from the first seat, a second elastic means normally keeping the second valve seat away from the shutter.

According to another embodiment of the invention, the control device comprises a hollow body, in which are formed a pressurized-fluid inlet chamber communicating with the pressure source, a pressurized-fluid outlet chamber communicating with the pressure chamber, a first control chamber communicating with the front chamber and a second control chamber communicating with the rear chamber, the inlet and outlet chambers forming between them a first valve seat, against which a first shutter is normally held to bear by a first elastic means, so as to provide a seal, by a means forming a piston which is axially aligned with the first valve seat and an extension of which forms a second shutter capable of coming to bear, so as to provide a seal on a second valve seat fixed to the first shutter in such a way as, in a first stage, to shut off communication between the pressurized-fluid outlet chamber and the front chamber when a pressure difference is established between the control chambers and, in a second stage, to move the first shutter away from the first seat, a second elastic means normally keeping the second shutter away from the second seat.

BRIEF DESCRIPTION OF THE DRAWINGS

Two preferred embodiments of the invention will now be described by way of non-limiting examples, with reference to the accompanying drawings in which.

DETAILED DESCRIPTION OF THE INVENTION

Figure 1:
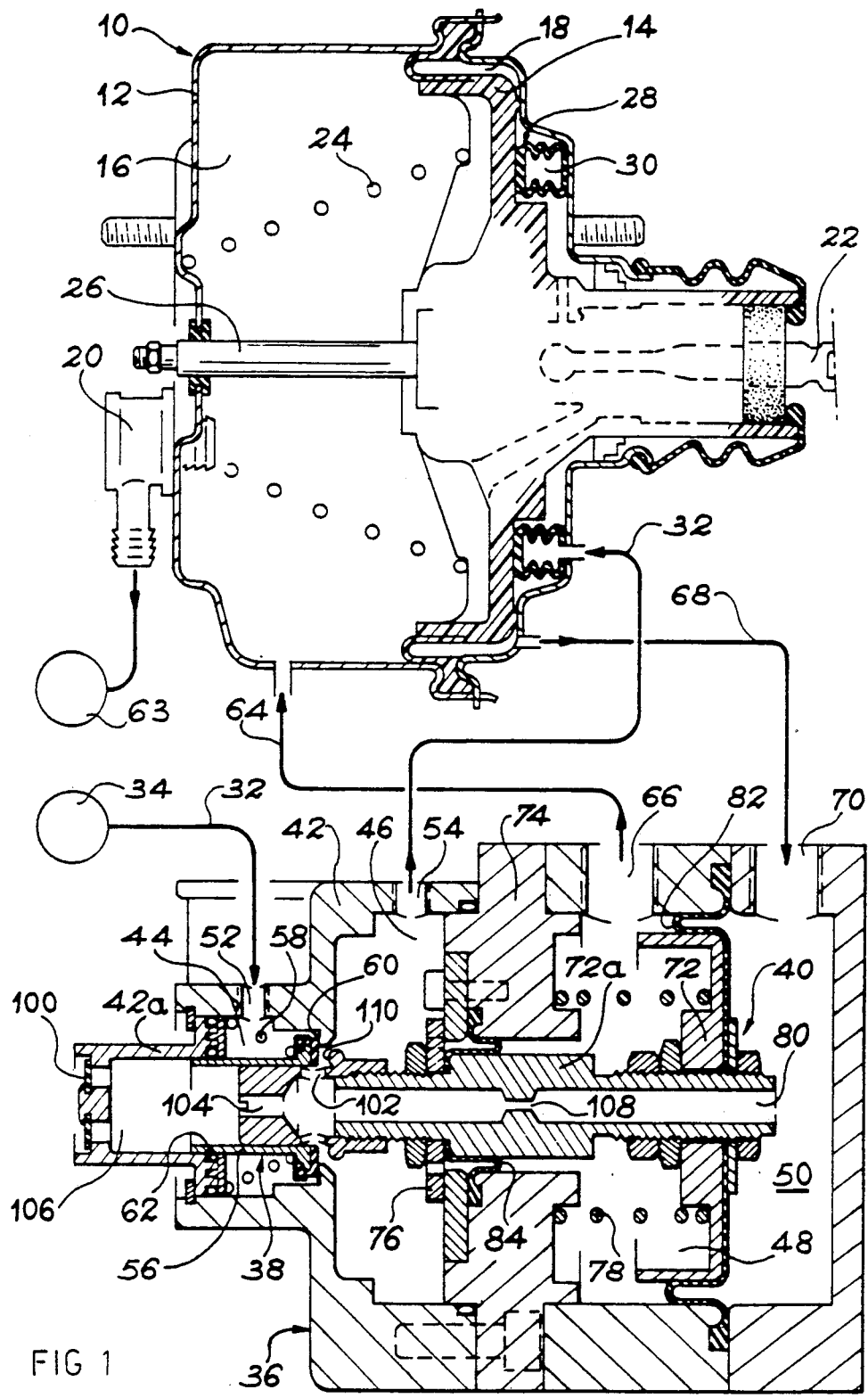
FIG. 1 shows diagrammatically part of a braking system having a booster, with which a control device according to the invention is associated, this device and the booster being shown in longitudinal section.

In FIG. 1, the reference 10 designates as a whole a brake booster of the pneumatic vacuum type. This booster is similar to that described in U.S. Pat. No. 4,117,769. Reference will therefore be made to this document for a detailed description.

To make it easy to understand the invention, it will be recalled here that the booster 10 comprises a housing 12, the inner volume of which is divided into two parts by means of a drive piston 14. Considering the installation of the booster on the vehicle, these two parts of the inner volume of the housing 12 form a front chamber 16 and a rear chamber 18. A connector 20 mounted on the housing 12 makes it possible to put the front chamber 16 in communication via a suitable circuit with a vacuum source 63 installed on the vehicle.

The booster 10 also possesses an input control member consisting of a push rod 22, the movement of which is controlled by the actuation of the brake pedal (not shown) of the vehicle. The end of the push rod 22 located in the drive piston 14 actuates a three-way valve (not shown) making it possible to put the rear chamber 18 in communication either with the front chamber 16 or with the outside atmosphere, depending on the relative position between the push rod 22 and the drive piston 14.

When the push rod 22 is not actuated the above-mentioned three-way valve puts the rear chamber 18 in communication with the front chamber 16 by means of ducts passing through the piston 14. The latter is then kept in its rear rest position, illustrated in the figure, by a compression spring 24 located in the front chamber 16 and interposed between the housing 12 and the piston 14.

When the vehicle driver actuates the brake pedal, the movement of the push rod 22 occurring as a result of this causes the above-mentioned three-way valve to change over, in such a way that communication between the chambers 16 and 18 is broken and the rear chamber 18 communicates with the outside atmosphere via ducts likewise formed in the drive piston 14. Under the effect of the resulting pressure difference between the chambers 18 and 16, a boosting force is exerted in the forward direction on the drive piston 14 counter to the spring 24. This force is transmitted to an output member consisting of a rod 26 which is conventionally connected to the master cylinder (not shown) equipping the braking circuit of the vehicle.

In the booster shown in the single figure, an auxiliary drive member 28 is also arranged in the rear chamber 18. In the exemplary embodiment illustrated, this drive member 28 consists of an annular containment, the outer and inner peripheral walls of which are formed by an elastomeric concertina diaphragm and the end walls of which are planar and bear respectively on a rear plate of the housing 12 and on the drive piston 14. The auxiliary drive member 28 thus delimits internally a pressure chamber 30 completely sealed relative to the rear chamber 18.

This pressure chamber 30 is connected, by means of a conduit 32 passing through the housing 12, to a pressurized-fluid source 34, located outside the booster 10, via a control device 36 produced according to the invention.

According to one embodiment of the invention, the control device 36 consists essentially of a normally closed valve 38 placed in the conduit 32 between the chamber 30 and the source 34 and of actuating means 40 which are continuously sensitive to the pressure difference prevailing between the front chamber 16 and the rear chamber 18 of the booster, in order to control the opening of the valve 38 automatically when the pressure in the rear chamber 18 exceeds the pressure in the front chamber 16 by a predetermined value.

More specifically, the control device 36 comprises a hollow body 42 produced in several parts, so as to form successively inside the body 42, from one end of the latter to the other, an annular pressurized-fluid inlet chamber 44, a pressurized-fluid outlet chamber 46, a first control chamber 48 and a second control chamber 50.

The pressurized-fluid inlet chamber 44 communicates with the source 34 via a duct 52 which is formed in the body 42 and to which is connected a part of the conduit 32 located upstream of the device 36. In turn, the outlet chamber 46 communicates with the pressure chamber 30 via a duct 54 which is likewise formed in the body 42 and to which is connected the part of the conduit 32 located downstream of the device 36.

The valve 38 is placed between the chambers 44 and 46 so as normally to break any communication between these chambers. For this purpose, an annular shutter 56, which delimits the inlet chamber 44 internally and on which a compression spring 58 bears, normally bears sealingly against a valve seat 60 formed in an axial passage via which the chambers 44 and 46 can communicate. The compression spring 58 is also arranged in the chamber 44, and its ends bear respectively on an end wall of the housing 42 and on the shutter 56.

Beyond this end wall of the housing 42, the latter is extended in the form of a tube 42a delimiting a discharge chamber 106, of which the communication with the outside atmosphere is controlled by a unidirectional shutter 100 allowing the fluid contained in the chamber 106 to be discharged into the atmosphere.

The annular valve 38 slides sealingly in the tube 42a by means of a gasket 62 isolating the chambers 44 and 106 from one another.

The first control chamber 48 of the device 36 communicates permanently either directly with the vacuum source 63 or with the front chamber 16 of the booster, as shown, by means of a conduit 64 connected to a duct 66 formed in the body 42. In a comparable way, the second control chamber 50 communicates permanently with the rear chamber 18 of the booster by means of a conduit 68 connected to a duct 70 likewise formed in the body 42.

Actuating means 40 of the valve 38 comprise a piston 72 which is mounted in a floating manner inside the body 42, in order to separate the first and second control chambers 48 and 50 sealingly. This piston 72 is arranged approximately in the same axis as the valve 38, and it possesses an extension 72a which passes through a partition 74 belonging to the body 42 and, within the latter, separating the outlet chamber 46 from the first chamber 48. This extension 72a passes through the outlet chamber 46, and its end is received within the annular shutter 38. Inside the chamber 46, the extension 72a supports a stop washer 76. Under the action of a compression spring 78 which is placed in the first chamber 48, the ends of which bear respectively on the partition 74 and on the piston 72, the latter normally occupies, at rest, a position in which the stop washer 76 bears against the partition 74, as illustrated in the figure.

In this rest position of the piston 72, the outlet chamber 46 communicates permanently with the chamber 106 via an axial duct 104 and radial ducts 102 formed in the end of the extension 72a. Between the stop washer 76 and the radial ducts 102, the extension 72a has an annular seat 110 capable of coming to bear sealingly on the shutter 38.

In the embodiment illustrated, the axial duct 104 is extended as far as the opposite end of the piston 72 by means of an axial duct 80 opening into the chamber 50 and having a restriction 108. In the rest position of the piston 72, the chamber 46 then communicates with the second control chamber 50 via this axial duct 80 and the radial ducts 102. Under these conditions, the rear chamber 18 of the booster communicates permanently with the pressure chamber 30 of the auxiliary drive member 28. Consequently, the behavior of the booster is then completely identical to that of a conventional booster not possessing an auxiliary drive member.

In an alternative embodiment (not shown), there is no duct 80. The chamber 30 then remains at atmospheric pressure as long as the piston 72 is at rest.

The floating mounting of the piston 72 inside the body 42 is obtained, between the control chambers 48 and 50, by means of a first sealing diaphragm 82 and, between the extension 72a and the partition 74, by means of a second diaphragm 84. These diaphragms 82 and 84 make it possible to center the piston 72 approximately within the body 42 of the control device, while at the same time allowing a slight deflection making it possible to guarantee sealing contact between the seat 110 and the shutter 56 when the piston 72 moves to the left, as seen in the figure, as will be described later.

At rest, the various elements of the control device 36 occupy the positions illustrated in the figure, that is to say the inlet chamber 44 and outlet chamber 46 are isolated from one another as a result of the sealing bearing of the shutter 56 on the valve seat 60 under the action of the spring 58. The pressure chamber 30 of the auxiliary drive member of the booster is therefore isolated from the pressure source 34. In contrast, the front chamber 46 can communicate with the second control chamber 50 via the duct 80, as mentioned above. In this case, the pressure prevailing in the chamber 30 is therefore identical to the pressure prevailing in the rear chamber 18 of the booster.

When the vehicle driver actuates the brake pedal, the control device 36 remains in the rest position illustrated in the figure, as long as the pressure difference between the control chambers 50 and 48 is below a predetermined threshold corresponding to the prestress stored in the spring 78. Because the control chambers 48 and 50 communicate respectively with the front chamber 16 and the rear chamber 18 of the booster, the position of the member forming a piston 72 therefore remains unchanged as long as the pressure prevailing in the rear chamber 18 does not exceed the pressure prevailing in the front chamber 16 of the booster by a value corresponding to said predetermined threshold. Before this threshold is reached, when there is the duct 80, the pressure in the chamber 30 of the auxiliary drive member 28 thus increases progressively at the same time as the pressure prevailing in the rear chamber 18. The boosting force exerted on the drive piston 14 of the booster is then identical to that of a conventional booster a the start of the braking phase.

When the braking phase continues beyond this initial phase, this corresponding in practice to emergency braking, the pressure difference between the rear chamber 18 and the front chamber 16, corresponding to the pressure difference between the control chambers 50 and 48, exceeds the threshold corresponding to the prestress stored in the spring 78. The member forming a piston 72 thus moves to the left, as seen in the figure, in such a way that the seat 110 carried by the extension 72a comes to bear sealingly on the shutter 56 and moves the latter away from the seat 60 counter to the spring 58. Thus, the outlet chamber 46 is first isolated from the control chamber 50 and from the chamber 106 and then put in communication with the inlet chamber 44. As a result of this, the chamber 30 of the auxiliary drive member 28, which was previously at the same pressure as the rear chamber 18 of the booster, experiences a rapid increase in its pressure as a result of being put in communication with the pressure source 34. An auxiliary boosting force added to the boosting force generated by the booster itself is thus applied to the drive piston 14, so that the force exerted on the output rod 26 of the booster increases more rapidly than in a conventional booster.

Of course, as soon as the vehicle driver releases the brake pedal, even momentarily, the pressure difference between the rear chamber 18 and the front chamber 16 of the booster falls again to a value below the calibration value of the spring 78, so that the means forming a piston 72 returns to its initial position shown in the figure. The pressure in the chamber 30 of the auxiliary drive member then once again becomes equal to the pressure in the rear chamber 18 of the booster as a result of discharge through the shutter 100 and then renewed suction by the booster via the duct 80, if this exists. If this duct 80 is absent, the pressure in the chamber 30 remains equal to the atmospheric pressure.

Figure 2:
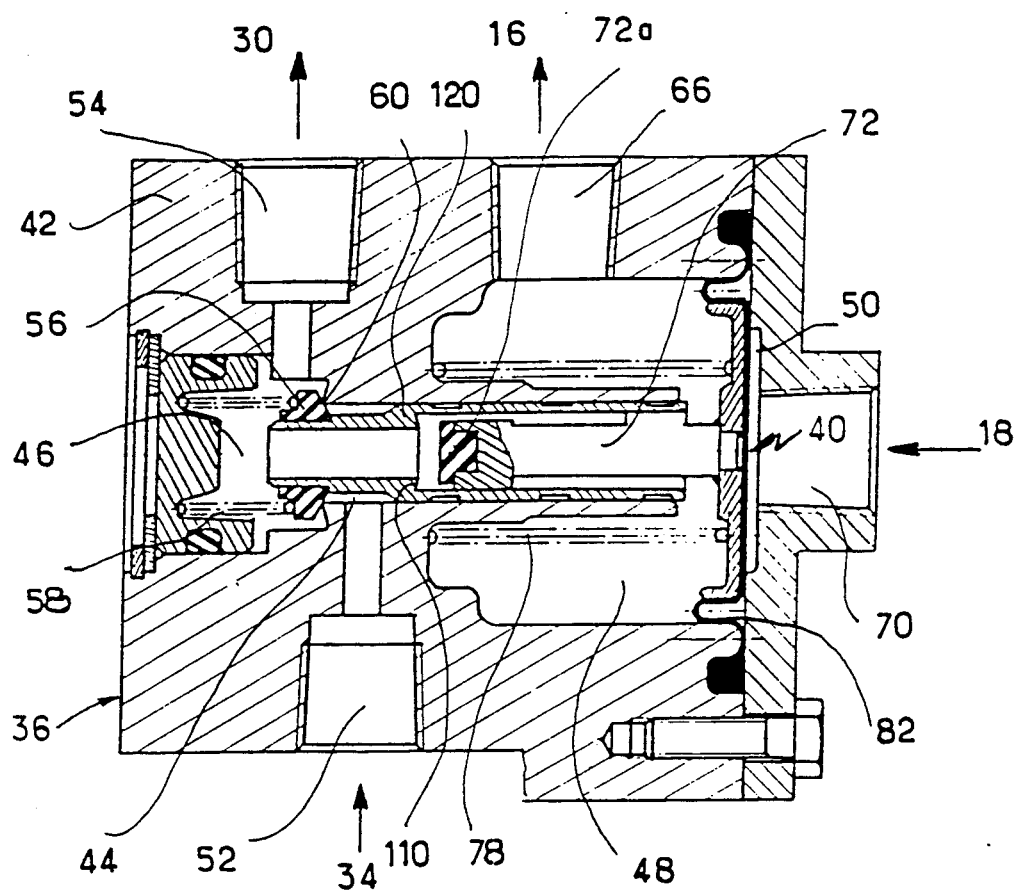
FIG. 2 shows diagrammatically another embodiment of a control device according to the invention.

FIG. 2 shows another embodiment of the control device 36 according to the invention.

Referring now to this FIG. 2, the body 42 is pierced by four passages 54,52,66,70 connected respectively to the pressure chamber 30, to a source of pressurized-fluid 34, for example compressed air, to the front chamber 16 of the booster and to the rear chamber 18 of the booster. The passage 54 communicates with an outlet chamber 46, while the passage 52 communicates with an annular inlet chamber 44. The passages 66 and 70 communicate respectively with the control chambers 48 and 50 which are separated so as to provide a seal, by an actuating means 40 composed of a piston 72 and of a sealing diaphragm 82. This actuating means 40 moves as a function of the difference between the pressures prevailing in the control chambers 48, 50 counter to a helical spring 78 arranged in one of these.

The end 72a of the piston 72 forms a shutter capable of coming to bear on a valve seat 110 made in a hollow cylinder 120, around part of which the annular inlet chamber 44 is formed.

An annular shoulder 60 in the body 48 forms another valve seat separating the inlet chamber 44 from the outlet chamber 46. An annular shutter 56 normally bears on this seat 60 by means of a helical spring 58 arranged in the outlet chamber 46.

When the system is at rest, that is to say when there is no braking, as shown in the Figure, the shutter 56 shuts off the communication between the inlet chamber 44 and the outlet chamber 46. The variations in the pressure of the pressurized-fluid in the inlet chamber 44 then have no effect on the system, the walls of the annular inlet chamber 44 balancing the assembly as a whole.

It is known that, at rest, the front chamber 16 and rear chamber 18 of the booster are under vacuum at the same pressure. This is also true of the pressure chamber 30 which then communicates with the front chamber 16 by way of the outlet chamber 46, the hollow cylinder 120, the valve 110, 72a, the control chamber 48 and the passage 66.

During braking, the pressure in the rear chamber 18 increases, while that in the front chamber 16 remains very low. The actuating means 40 sensitive to this difference between the pressures prevailing in the control chambers 48 and 50, where the difference in the pressure between the front and rear chambers is repeated, consequently moves counter to the spring 78 and, in a first stage, the shutter 72a comes to bear on the valve seat 110. It is clear that this cuts off communication between the pressure chamber 30 and the front chamber 16. The shutter 56, which is fixed to the hollow tube 120, remains bearing on its seat 60 under the effect of the spring 58, the prestress of which will determine the opening threshold of this shutter when the difference between the pressures prevailing in the control chambers 48, 50 increases further. Beyond this threshold, that is to say in a second stage, the shutter 56 moves away from its seat 60 and the inlet and outlet chambers 44 and 46 communicate.

The pressurized-fluid source 34 is then connected directly to the pressure chamber 30, thereby correspondingly increasing the force exerted by the booster.

The reaction of the pressurized-fluid on the shutter 56 tends to push the latter onto its seat 60 and balances the opposing force determined by the action of the difference between the pressures prevailing in the chambers 48, 50 on the actuating means 40.

When the vehicle driver releases the brake, the control device functions in reverse, that is to say the shutter 56 first comes to bear again on the seat 60, so as to shut off communication between the pressure source 34 and the pressure chamber 30, and then, when the brake has been released completely, the shutter 72a moves away from its seat 110, thus once pressure chamber 30 in communication with the front chamber 16 of the booster. The device then resumes its rest position shown.

By means of the control device 36 according to the invention, it is therefore possible, without modifying the booster, to increase its efficiency automatically when the pressure difference between the rear and front chambers of the latter exceeds a predetermined threshold. For a given dimension of the booster, its efficiency is therefore increased. Conversely, an efficiency comparable to that of a conventional booster is obtained for a reduced overall diametrical dimension.

Of course, the invention is not limited to the embodiments just described by way of example, but embraces all their alternative versions. Firstly, the control device according to the invention, instead of being completely pneumatic, as just described, can consist of an electromagnetic valve, the movements of which are controlled in response to electric signals generated by a computer receiving signals representing the pressure prevailing respectively in the rear and front chambers of the booster. Moreover, the construction of the pneumatic control device described can have various modifications which take into account the conventional knowledge of a person skilled in the art, without departing from the scope of the invention.

What we claim is:

1. A control device and a booster, the booster comprising a housing in which a drive piston separating a front chamber from a rear chamber can move in the event of an actuation of an input control member generating a pressure difference between the rear chamber and the front chamber, and an auxiliary drive member having a pressure chamber located in the rear chamber of the booster, the control device for exerting an additional boosting force automatically on said drive piston and located between the pressure chamber of the booster and a pressure source and further comprising a normally closed valve via which the pressure chamber communicates with the pressure source, and means for actuating said valve and which is sensitive to a pressure difference between the rear chamber and front chamber in order to open the valve automatically when said difference exceeds a predetermined threshold, the control device further comprising a hollow body in which is formed a pressurized-fluid inlet chamber communicating with the pressure source, a pressurized-fluid outlet chamber communicating with the pressure chamber, a first control chamber communicating with the front chamber and a second control chamber communicating with the rear chamber, said inlet and outlet chambers forming therebetween a first valve seal against which a shutter is normally kept bearing sealingly by first elastic means, the first and second control chambers being separated sealingly by means forming a piston which is axially aligned with the valve seat and an extension of which carries a second valve seat capable of coming to bear sealingly on the shutter and of moving the latter away from the first valve seat, and second elastic means normally keeping the second valve seat away from the shutter.

2. The control device and booster according to claim 1, wherein said threshold is determined by the value of the prestress stored the second elastic means.

3. The control device and booster according to claim 2, wherein the shutter is an annular shutter delimiting internally a discharge chamber isolated from the inlet chamber and communicating with atmosphere via a non-return valve, said discharge chamber communicating with the outlet chamber when the second valve seat does not bear on the shutter.

4. The control device and booster according to claim 3, wherein said extension passes sealingly through a partition of a hollow body separating the outlet chamber from the first control chamber.

5. The control device and booster according to claim 4, wherein said means forming a piston has passing axially therethrough a duct via which the outlet chamber normally communicates with the second control chamber, said duct being closed off when the second valve seat bears on the shutter.

6. The control device and booster according to claim 5, wherein the duct has a restriction.

7. The control device and booster according to claim 5, wherein the extension of the means forming a piston supports a stop placed in the outlet chamber and normally kept bearing on said partition by the second elastic means.

8. The control device and booster according to claim 7, wherein the second elastic means comprises at least one compression spring placed in the first control chamber.

9. The control device and booster according to claim 7, wherein the first elastic means comprises at least one compression spring placed in the inlet chamber.

10. The control device and booster according to claim 7, wherein the means forming a piston is mounted in a floating manner inside the hollow body.

11. A control device and a booster, the booster comprising a housing in which a drive piston separating a front chamber from a rear chamber can move in the event of an actuation of an input control member generating a pressure difference between the rear chamber and the front chamber, and an auxiliary drive member having a pressure chamber located in the rear chamber of the booster, the control device for exerting an additional boosting force automatically on said drive piston and located between the pressure chamber of the booster and a pressure source and further comprising a normally closed valve via which the pressure chamber communicates with the pressure source, and means for actuating said valve and which is sensitive to a pressure difference between the rear chamber and front chamber in order to open the valve automatically when said difference exceeds a predetermined threshold, the control device further comprising a hollow body in which is formed an inlet chamber for pressurized-fluid, a pressurized-fluid outlet chamber communicating with the pressure chamber, a first control chamber communicating with the front chamber and a second control chamber communicating with the rear chamber, said inlet and outlet chambers forming between them a first valve seat against which a first shutter is normally held to bear in a sealed manner by first elastic means so as to provide a seal, the first and second control chambers being separated in a sealed manner by means forming a piston which is axially aligned with the first valve seat and an extension of which forms a second shutter capable of coming to bear, so as to provide a seal, on a second valve seat fixed to the first shutter in such a way as, in a first stage, to shut off a communication between said pressurized-fluid outlet chamber and said front chamber when a pressure difference is established between said control chambers and, in a second stage, to move said first shutter away from the first valve seat, and second elastic means normally keeping said second shutter away from said second valve seat.

12. The control device and booster according to claim 11, wherein said inlet chamber is an annular chamber, said first shutter being annular and being fixed to a hollow cylinder carrying the second valve seat, said outlet chamber communicating with said front chamber by means of said hollow cylinder when said second shutter does not bear on second valve seat.

13. The control device and booster according to claim 12, wherein the prestress stored in said first elastic means determines said predetermined threshold.

14. The control device and booster according to claim 13, wherein said first elastic means is composed of a compression spring arranged in said outlet chamber and bearing against said first shutter.

15. The control device and booster according to claim 14, wherein said second elastic means is composed of a spring arranged in one of said control chambers.

* * * * *